United States Patent
Staerzl

(10) Patent No.: US 7,511,276 B2
(45) Date of Patent: Mar. 31, 2009

(54) HEAT SOURCE SENSOR FOR A MARINE VESSEL

(75) Inventor: Richard E. Staerzl, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 11/656,046

(22) Filed: Jan. 22, 2007

(65) Prior Publication Data

US 2008/0173818 A1    Jul. 24, 2008

(51) Int. Cl.
 G01J 5/02    (2006.01)
 G01J 5/00    (2006.01)
(52) U.S. Cl. .................... 250/342; 250/338.1
(58) Field of Classification Search ............... 250/338.1, 250/DIG. 1, 342
See application file for complete search history.

(56) References Cited

U.S. PATENT DOCUMENTS

| | | | |
|---|---|---|---|
| 3,936,822 A | 2/1976 | Hirschberg | 340/420 |
| 3,958,118 A | 5/1976 | Schwarz | 250/221 |
| 4,982,176 A | 1/1991 | Schwarz | 340/567 |
| 5,074,488 A | 12/1991 | Colling | 244/1 R |
| 5,283,427 A | 2/1994 | Phillips et al. | 250/214 VT |
| 5,987,205 A | 11/1999 | Moseley et al. | 385/125 |
| 6,100,803 A | 8/2000 | Chang | 340/567 |
| 6,354,892 B1 | 3/2002 | Staerzl | 440/1 |
| 6,380,871 B1 | 4/2002 | Kaplan | 340/984 |
| 6,450,845 B1 | 9/2002 | Snyder et al. | 440/1 |
| 6,676,460 B1 | 1/2004 | Motsenbocker | 440/1 |
| 6,693,561 B2 | 2/2004 | Kaplan | 340/984 |
| 6,737,971 B2 | 5/2004 | Knaak | 340/557 |
| 7,105,800 B1 | 9/2006 | Staerzl | 250/221 |
| 2002/0020816 A1* | 2/2002 | Leen | 250/342 |
| 2008/0083868 A1* | 4/2008 | Wipiejewski et al. | 250/221 |

* cited by examiner

*Primary Examiner*—David P Porta
*Assistant Examiner*—Carolyn Igyarto
(74) *Attorney, Agent, or Firm*—William D. Lanyi

(57) ABSTRACT

Two sensor units are mounted on opposite sides of a transom of a boat and directed to a common location behind the boat. The field of view of the two sensors overlaps behind the marine propulsion unit of the boat to detect the presence of a heat emitting object, such as a mammal. Housing structures contain infrared sensing elements, lenses, and light shields. Signals from four infrared sensing elements are received by a controller which reacts, with an alarm signal, when at least two of the four sensors detect a heat emitting object within their individual fields of view. False triggering can be reduced by not providing an alarm signal if only the two most inboard sensors detect the heat emitting object.

6 Claims, 8 Drawing Sheets

HEAT SOURCE SENSOR FOR A MARINE VESSEL

BACKGROUND OF THE INVENTION

1. Field of the Invention

The present invention relates generally to a heat source sensor and, more particularly, to a sensor unit for sensing a heat source near a marine vessel and, more particularly, to a sensor unit that is particularly configured to be mounted on the marine vessel in combination with another sensor unit to detect the heat source in a region behind the transom of the marine vessel.

2. Description of the Related Art

Those skilled in the art of sensing sources of heat are familiar with the use of infrared detectors and motion sensors to accomplish this purpose. In addition, those skilled artisans in the field of sensing heat emitting objects are aware of many different systems that are capable of determining the presence of a mammal, such as a human being, within the sensing area of an infrared sensor. Furthermore, those skilled in these fields are aware that most heat sensors operate on the concept of sensing a change in the location or intensity of a heat emitting object. As such, these sensors typically react to the movement of a heat emitting object into or out of the sensing region of the sensor.

U.S. Pat. No. 3,936,822, which issued to Hirschberg on Feb. 3, 1976, describes a method and apparatus for detecting weapon fire. Radiant and acoustic energy produced upon occurrence of the firing of a weapon and emanating from the muzzle thereof are detected at known, substantially fixed, distances therefrom. Directionally sensitive radiant and acoustic energy transducer means directed towards the muzzle to receive the radiation and acoustic pressure waves therefrom may be located adjacent each other for convenience.

U.S. Pat. No. 3,958,118, which issued to Schwarz on May 18, 1976, describes an intrusion detection device. It includes an array of infrared detectors with associated means for selectively increasing the number of scanned zones which may be monitored by the same detector array, by providing an optical system with reflectors and/or lenses having a multiplicity of facets set at selected angles to direct primary impulses received from the portions of the entire scanned field sequentially to the detector array.

U.S. Pat. No. 4,982,176, which issued to Schwarz on Jan. 1, 1991, describes a solar powered lighting and alarm system activated by motion detection. Solar powered outdoor lighting and/or alarm systems are provided and include a light source or alarm, a passive infrared sensor in conjunction with a battery recharged via solar cells, and a control circuit coupled to the light source or alarm, the PIR (passive infrared) sensor, and the rechargeable battery.

U.S. Pat. No. 5,074,488, which issued to Colling on Dec. 24, 1991, describes an aircraft engine deactivation apparatus. The apparatus is intended for stopping an aircraft engine while the aircraft is on the ground. The apparatus is for safety purposes and is used to prevent a detected object from coming into contact with an engine driven propeller or a jet propulsion intake. A detector, preferably an infrared radiation sensor, detects an object or person within the selected distance and within a selected area about the engine. Upon detection, a mechanical engine deactivator, such as brake calipers engageable with the engine flywheel, or an electronic deactivator, such as an electronic switch operable to ground magnetos, shuts down the engine.

U.S. Pat. No. 5,283,427, which issued to Phillips et al. on Feb. 1, 1994, describes a night sight for a missile launcher comprising an image intensifier tube, a reticle, and an objective lens. The night sight has an objective lens with a field of view of at least 22 degrees. The output image of the objective lens is intensified by a variable gain light intensifier tube and the output of the intensifier is viewed through an eyepiece. A reticle pattern etched on a glass substrate and filled with titanium dioxide is illuminated by adjustable brightness LED's positioned at points on the periphery of the substrate.

U.S. Pat. No. 5,987,205, which issued to Moseley et al. on Nov. 16, 1999, describes an infrared energy transmissive member and radiation receiver. The infrared energy transmissive member is intended for conducting infrared energy from a first end of the infrared energy transmissive member to a second end disposed adjacent an infrared responsive circuit component of an infrared receiver, the member comprising a flexible hollow plastic tube.

U.S. Pat. No. 6,100,803, which issued to Chang on Aug. 8, 2000, describes an infrared illuminative warning detector. The detector includes a base seat formed with at least four perforations for two light shades and two detector heads to insert therein. A bulb is installed in each light shade. An infrared detector is disposed in each detector head for detecting alien article within a detection range and lighting up the bulb. Each light shade and detector head is disposed with at least one shifting mechanism for freely changing operating position.

U.S. Pat. No. 6,354,892, which issued to Staerzl on Mar. 12, 2002, discloses a safety device for a marine vessel. It provides an infrared sensor with a tube having a central cavity in order to define a viewing angle which is more narrow than the inherent viewing angle of the infrared sensor. The central cavity of the tube also defines a line of sight that can be directed toward a particular region near a marine vessel that is to be monitored for the presence of a heat generating object, such as a human being. An alarm circuit is responsive to signals from the infrared sensors and deactivates the marine propulsion system when a heat generating object is near the marine propulsion system.

U.S. Pat. No. 6,380,871, which issued to Kaplan on Apr. 30, 2002, describes a search for and method of searching for targets in a marine environment. An above-the-water system for and method of finding targets, both animate and inanimate, in a marine environment, especially by determining the distance and depth of targets at, above, or below the surface of, the water. An optical transmitter transmits infrared and ultraviolet light beams toward different zones of coverage on the water. An optical receiver equipped with a segmented detector separately detects return target reflections. An indicator, including range and depth indicators, provides information as to the distance to the target and, if it is below the water, its depth.

U.S. Pat. No. 6,450,845, which issued to Snyder et al. on Sep. 17, 2002, discloses a passive occupant sensing system for a watercraft. A tetherless occupant detector system uses an infrared sensor and a monitor circuit that provides a deactivation signal to an engine control unit or other control mechanisms in the event of an operator of the marine vessel leaving a preselected control position at its helm. The infrared sensor provides an output signal that is generally representative of the heat produced by an occupant within the control position of a marine vessel.

U.S. Pat. No. 6,676,460, which issued to Motsenbocker on Jan. 13, 2004, describes an electronic propeller guard. Electronic methods, devices and kits electronically protect swimmers, animals and other objects in water from propeller strikes, and alleviate propeller damage. Desirable embodiments include continuous ultrasonic sensing and detection by separate sensors to minimize reaction time for stopping internal combustion engine and electric motor driven propellers.

U.S. Pat. No. 6,693,561, which issued to Kaplan on Feb. 17, 2004, describes a system for and method of wide searching for targets in a marine environment. An above-the-water system for and method of finding targets, both animate and inanimate, in a marine environment, especially by determining the distance and depth of targets at, above or below the surface of, the water is disclosed. An optical transmitter transmits infrared and ultraviolet light beams toward different zones of coverage on the water.

U.S. Pat. No. 6,737,971, which issued to Knaak on May 18, 2004, describes an apparatus for detecting an object approaching a vessel and associated method. The apparatus includes a laser light curtain comprising at least one pulsed laser light beam extending radially from the ship toward a perimeter thereabout, the laser light curtain positioned spaced apart from and approximately parallel to an approach surface for detecting an object interrupting the light curtain.

U.S. Pat. No. 7,105,800, which issued to Staerzl on Sep. 12, 2006, discloses a detection system and method for a propeller driven marine vessel with a false triggering prevention capability. The detection system uses an infrared sensor to detect the presence of a human being or mammal in a target area near the propeller. A visible light detector is used to determine whether or not a signal received from the infrared sensor is caused by reflected sunlight and not the actual presence of a human being or mammal. By detecting visible light, false triggering of the system in response to infrared radiation received from sunlight can be significantly reduced. Embodiments of the system can monitor gear position and engine speed in combination with signals received from the infrared sensor and visible light sensors to determine an appropriate action to take in response to the presence of infrared radiation above a preselected threshold.

The patents described above are hereby expressly incorporated by reference in the description of the present invention.

Although it is well known to those skilled in the art to use infrared detectors and alternative types of motion detectors to sense the presence of a heat emitting object, such as a mammal, within a detection zone, the appropriate use of this type of device in a marine environment is difficult because of the presence of many heat sources other than mammals. For example, sunlight reflected by the surface of the water can provide false triggering because of the rapidly varying magnitudes and directions of infrared light resulting therefrom. Additionally, heated cowls of outboard motors can provide a sufficiently intense infrared signal that a detector might incorrectly identify as a mammal in the region of the outboard motor. It would therefore be significantly beneficial if a detection system could be provided for sensing the presence of heat emitting objects within a preselected detection zone which is less sensitive to false triggering and easily adapted for use with a marine vessel.

SUMMARY OF THE INVENTION

A heat source sensor, made in accordance with a preferred embodiment of the present invention, comprises a first housing structure, a first light sensitive element, and a first light shield. The first light sensitive element is mounted in the first housing structure and configured to have a first field of view which extends away from the first housing structure in a first direction. The first light sensitive element is configured to provide a first signal in response to the detection of a source of heat within the first field of view. The first light shield is configured to limit the first field of view for the purpose of avoiding the detection of heat sources at first preselected regions relative to the first housing structure. Second, third and fourth housing structures are similarly constructed.

The preselected regions comprise a zone between the respective light shields and the position of the sun in order to block that specific source of infrared light from directly affecting the associated light sensitive element. The preselected regions also comprise the upper left and upper right sides of each of the light shields. Each of the first, second, third, and fourth light sensitive elements is provided with an associated lens structure. In a particularly preferred embodiment of the present invention, the lenses are Fresnel lenses.

The first and second housing structures are combined to form a first sensor unit and the third and fourth housing structures are combined to form a second sensor unit. The first sensor unit is attached to a starboard side of a boat transom and a second sensor unit is attached to a port side of a boat transom.

At least one of the first and second fields of view, of the first and second light sensitive elements, intersects with at least one of the third and fourth fields of view, of the third and fourth light sensitive elements, at a common location which is behind the transom of the boat. In one preferred embodiment of the present invention, this location behind the transom of the boat is located approximately 10 feet from the transom. However, it should be understood that, because of the various fields of view provided by the present invention and their relative positions on the transom, a heat emitting object will be sensed if that object is within a large area that extends from a marine propulsion unit attached to the transom in several directions and for a preselected distance away from the marine propulsion unit.

In a preferred embodiment of the present invention, each of the light sensitive elements is offset from a generally vertical plane which bisects its associated light shield. This asymmetry provides a benefit which will be described in greater detail below.

A method for detecting a heat source proximate a marine vessel, in accordance with a particularly preferred embodiment of the present invention, comprises the steps of monitoring a first field of view in a first direction from a first sensing device, providing a first signal when a heat source is within the first field of view, monitoring a second field of view in a second direction from a second sensing device, providing a second signal when a heat source is within the second field of view, receiving the first and second signals, and determining the presence or absence of a heat source within a detection zone as a function of both the first and second signals.

In a preferred embodiment of the present invention, the first and second sensing devices contain first and second infrared devices. The first and second sensing devices are attached to the marine vessel with first and second fields of view directed in a rearward direction. The detection zone is defined by an intersection of the first and second fields of view which are located a preselected distance behind the marine vessel. The first sensing device is attached to a starboard side of a rearward portion of the marine vessel and the second sensing device is attached to a port side of the rearward portion of the marine vessel.

The first sensing device comprises a first sensor and a second sensor and the second sensing device comprises a third sensor and a fourth sensor. The second sensor is disposed closer to a centerline of the marine vessel, such as its keel line, than the first sensor and the third sensor is disposed closer to that centerline of the marine vessel than the fourth sensor. The first, second, third, and fourth sensors are each configured to provide an individual signal representing the detection of the heat source within its individual field of view. The method of the present invention, in a preferred embodiment, further comprises the step of providing an alarm signal in response to receipt of individual signals from at least two of the first, second, third, and fourth sensors. The method in a preferred embodiment of the present invention further comprises the step of providing an alarm signal in response to receipt of individual signals from said first and second sensors, said first and third sensors, said first and fourth sensors, said second and fourth sensors, or said third and fourth sensors. In a preferred embodiment of the present invention, it further comprises the step of refraining from providing the alarm signal in response to receipt of individual signals from only the second and third sensors.

BRIEF DESCRIPTION OF THE DRAWINGS

The present invention will be more fully and completely understood from a reading of the description of the preferred embodiment of the present invention in conjunction with the drawings, in which.

DESCRIPTION OF THE PREFERRED EMBODIMENT

Figure 1:
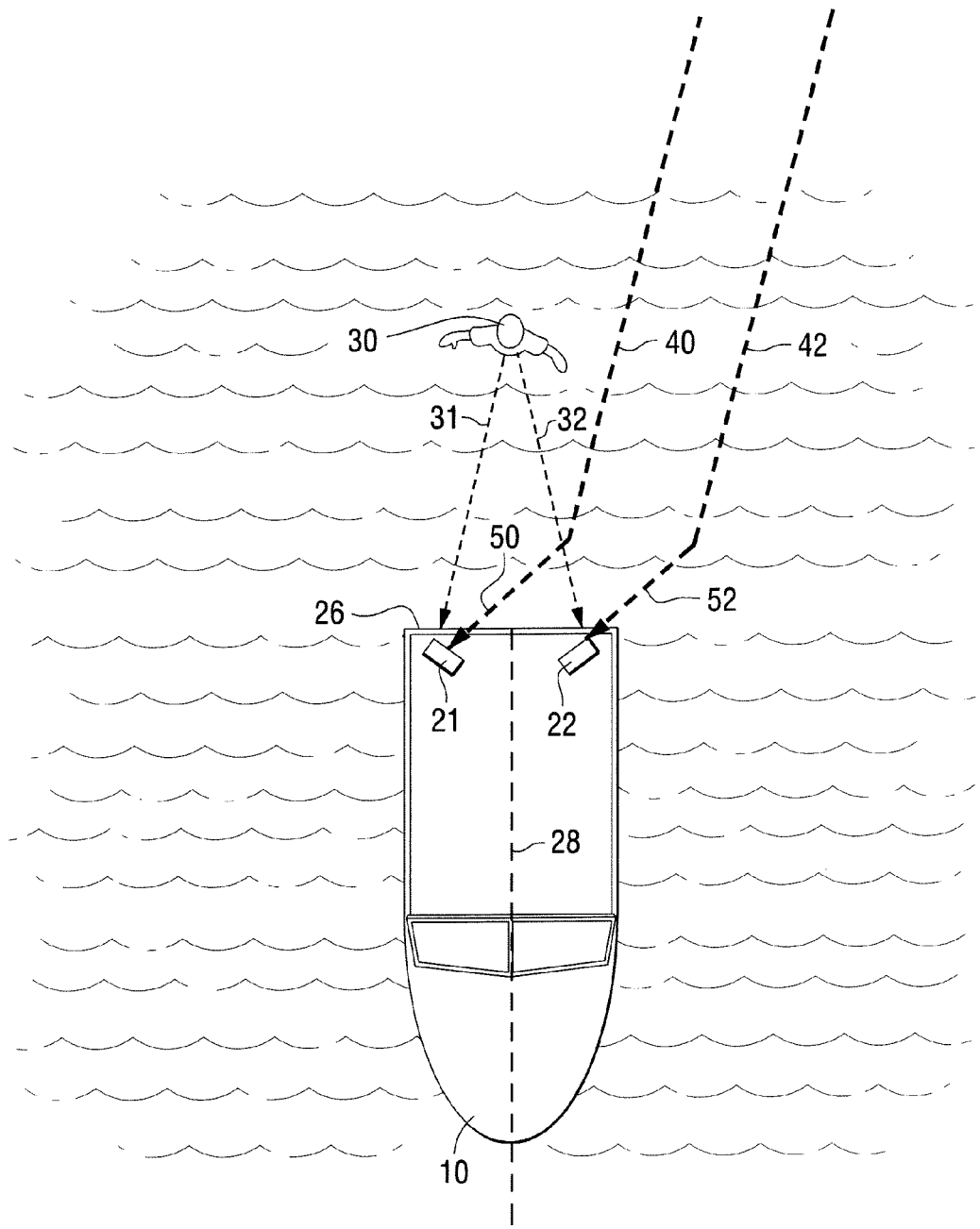
FIG. 1 is a highly schematic representation of a boat with two sensors made in accordance with a preferred embodiment of the present invention.

Throughout the description of the preferred embodiment of the present invention, like components will be identified by like reference numerals.

FIG. 1 is a highly schematic drawing of a boat 10 on a body of water, viewed from above the boat. A first sensing device 21 and a second sensing device 22 are mounted at the transom 26 of the boat 10. Although the preferred embodiment of the present invention will be described in terms of mounting the first and second sensing devices, 21 and 22, on a generally horizontal surface near the transom 26 of the boat 10, it should be understood that alternative embodiments of the present invention could mount the first and second sensing devices on the generally vertical surface of the transom 26 itself. The first and second sensing devices are each mounted at an angle relative to the transom 26 and relative to a centerline 28 of the boat. A heat emitting object 30 is shown behind the boat 10. Infrared radiation emitted by the heat emitting body 30 is schematically represented by dashed lines 31 and 32. The emitted infrared light from the heat emitting object 30, such as a human being or other mammal, is received by the first and second sensing devices, 21 and 22.

With continued reference to FIG. 1, dashed lines 40 and 42 represent sunlight prior to its reflection from the surface of the water. Dashed lines 50 and 52 represent reflected sunlight from the surface of the water which is reflected in a direction generally toward the first and second sensing devices. One of the functions of a preferred embodiment of the present invention is to detect a heat emitting object 30, such as a swimmer, in the region surrounding the marine propulsion device, such as an outboard motor, without being adversely affected by infrared radiation reflection from the water or surfaces of the marine propulsion device. In addition, a function of a preferred embodiment of the present invention is to further avoid false triggering because of direct or indirect infrared radiation other than heat emitting objects in the water behind the boat 10. For example, a preferred embodiment of the present invention provides a light shield that blocks infrared radiation directly from the sun and also from the upper cowl portion of an outboard motor.

Figure 2:
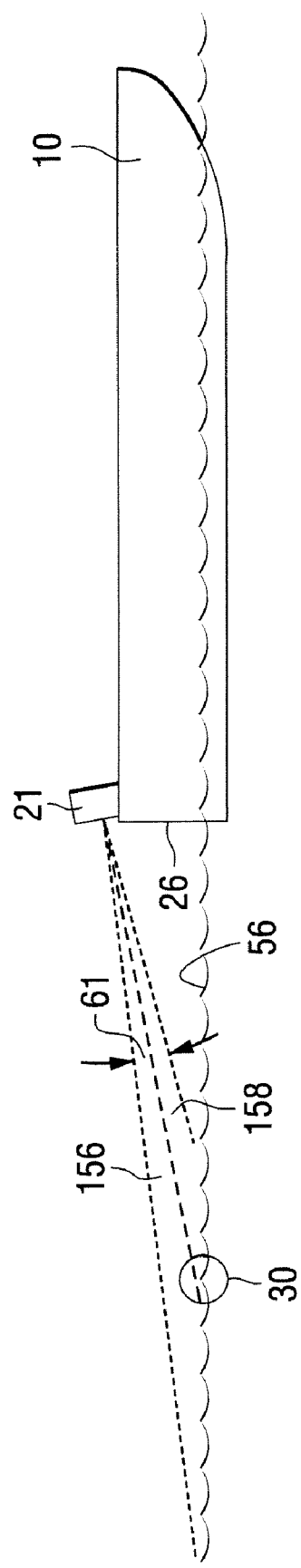
FIG. 2 is a side view showing a heat source detector mounted on the transom of the boat.

FIG. 2 is a side view of a boat 10 showing the sensing device of a preferred embodiment of the present invention mounted on the transom 26 and directed at an angle downward toward the water 56. Although only one of the first and second sensing devices is visible in FIG. 2, its field view 61 is representative of the other similarly configured components of the present invention.

Figure 3:
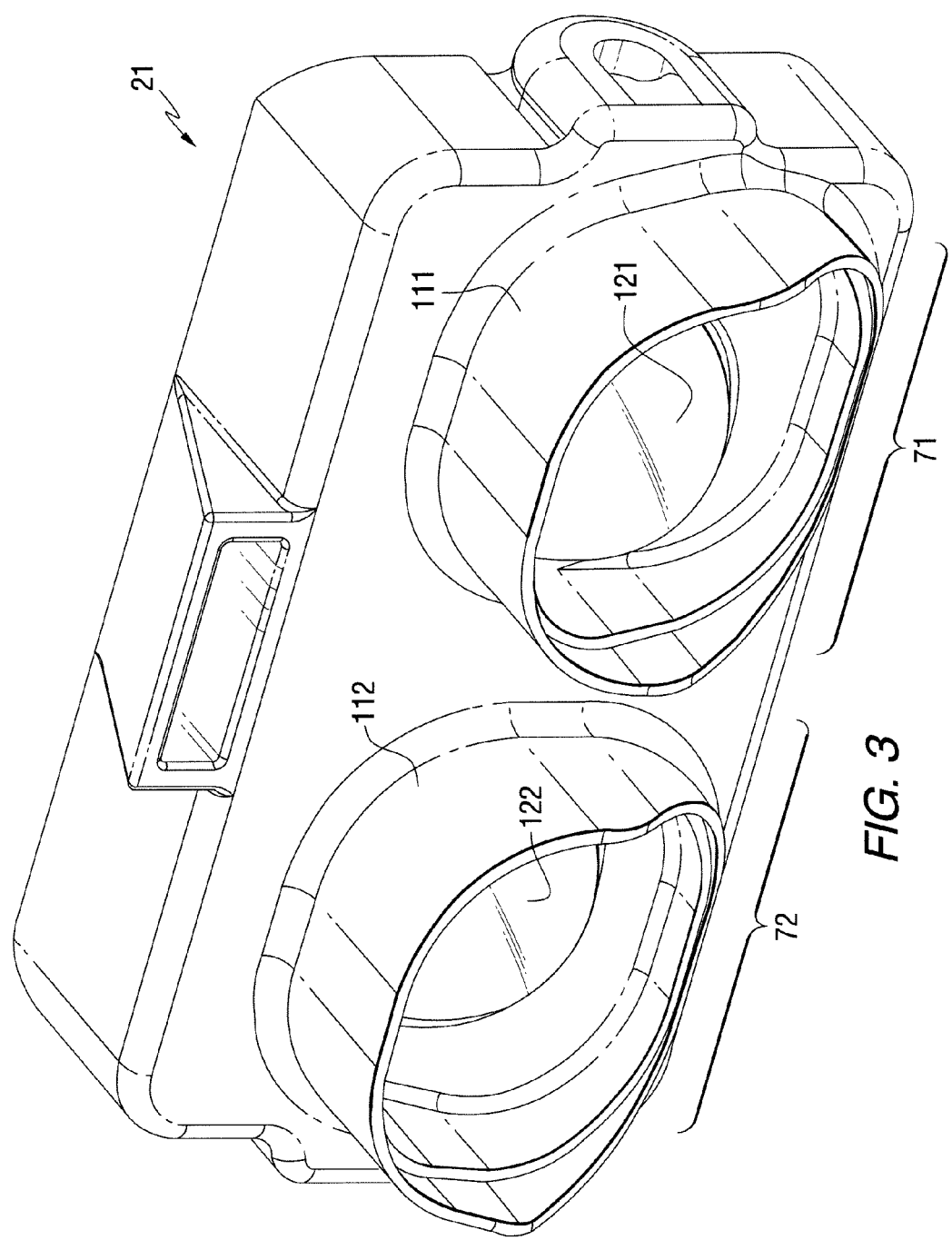
FIG. 3 is an isometric view of a housing structure for containing the operative components of the present invention.

FIG. 3 is an isometric view of the first sensor unit 21, or first sensing device. In the terminology used to describe a preferred embodiment of the present invention, first and second housing structures, 71 and 72, are combined together to form a sensing unit such as the first sensor unit 21 shown in FIG. 3. Although the first and second housing structures could be separately constructed and mounted in alternative embodiments of the present invention, a preferred embodiment uses a unitary housing which provides the housing structure for both the first and second housing structures, 71 and 72.

Figure 4:
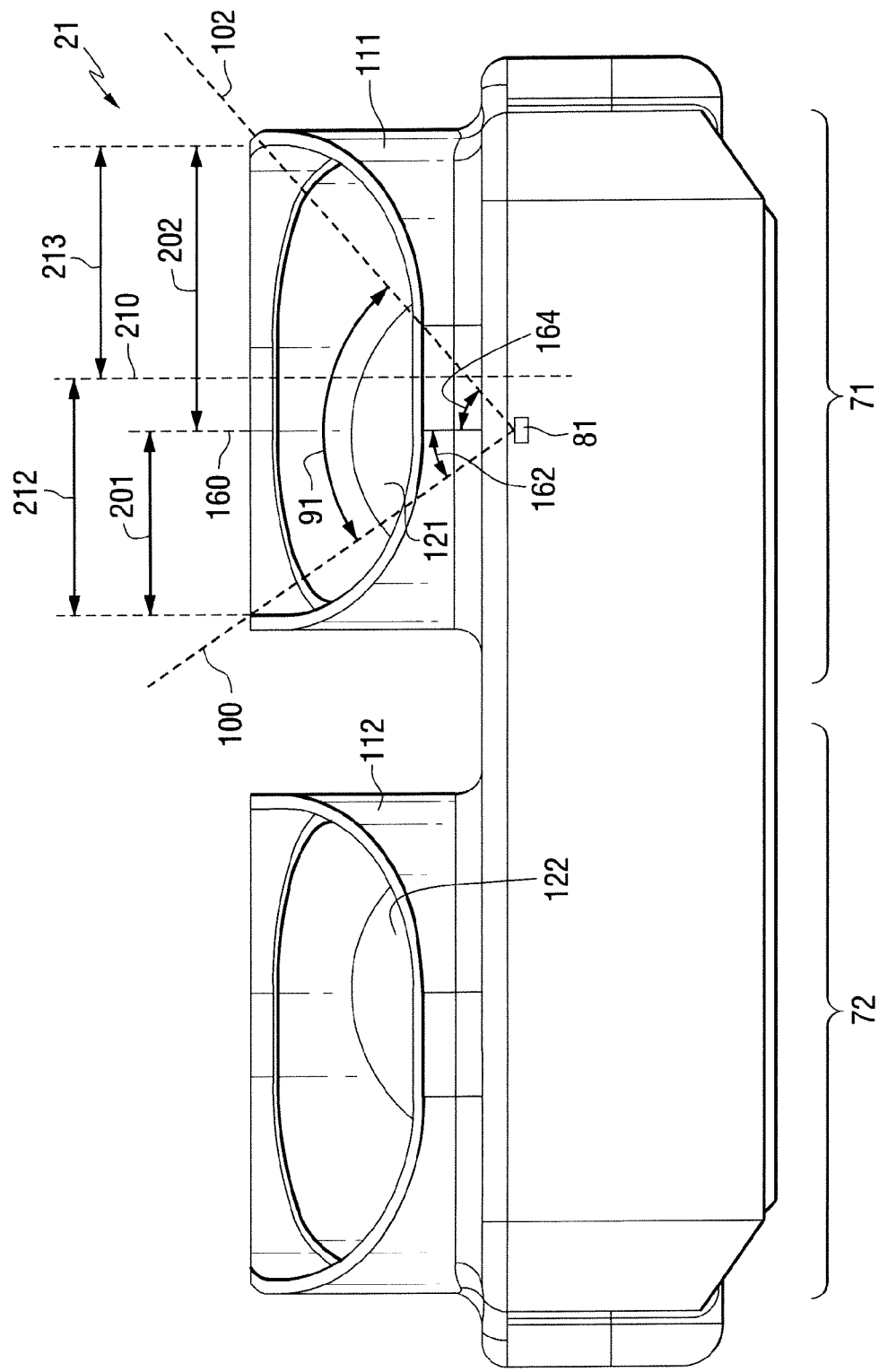
FIG. 4 is a bottom view of the housing structure of FIG. 3.

FIG. 4 shows a bottom view of the first sensor unit 21. With reference to FIGS. 3 and 4, a first light sensitive element 81 is mounted in the first housing structure 71 and configured to have a first field of view 91 which is identified by dashed lines 100 and 102. The first field of view 91 extends away from the first housing structure 71 in a first direction as illustrated in FIG. 4. The first light sensitive element 81 is configured to provide a first signal in response to the detection of a source of heat within the first field of view 91.

With continued reference to FIGS. 3 and 4, a first light shield 111 is disposed at least partially around the first field of view 91 proximate the first housing structure 71. The first light shield 111 is configured to limit the first field of view 91 for the purpose of avoiding the detection of heat sources at first preselected regions relative to the first housing structure 71. As can be seen in FIGS. 3 and 4, the second housing structure 72 is similarly provided with a second light shield 112 associated with a second light sensitive element 82 which is not shown in FIG. 4, but will be described in greater detail below. A first lens structure 121 and a second lens structure 122 are illustrated in FIG. 4 associated with the first and second light sensitive elements. In a particularly preferred embodiment of the present invention, the first and second lens structures, 121 and 122, are Fresnel lenses.

Figure 5:
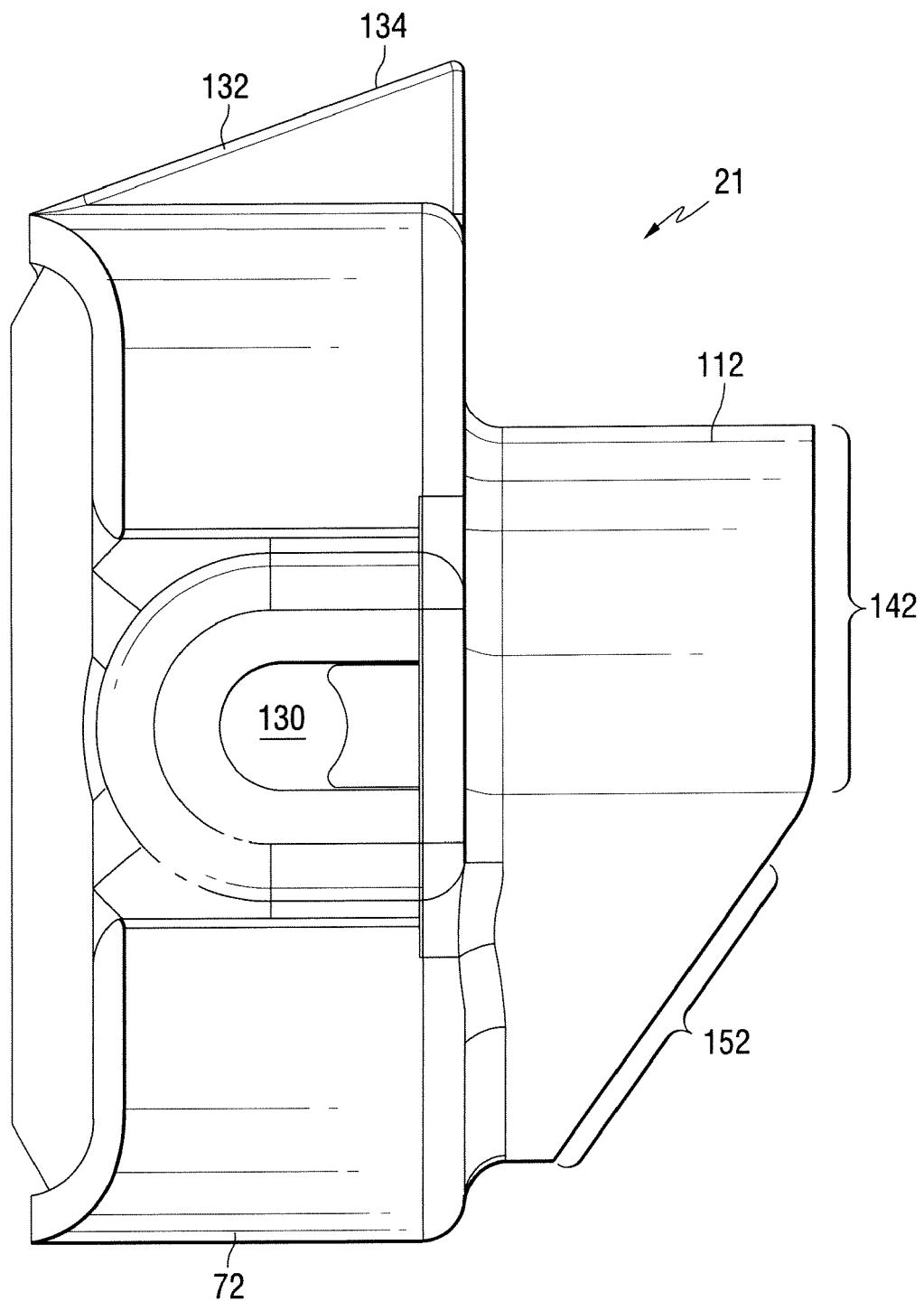
FIG. 5 is a side view of the housing structure of FIGS. 3 and 4.

FIG. 5 is a side view of the combined housing structure 21 which comprises the first and second housing structures, 71 and 72, that are described above in conjunction with FIGS. 3 and 4. The side view in FIG. 5 shows a pivot support structure 130 which allows the first sensor unit 21 to be supported by a bracket that is attachable to a marine vessel. The pivot support structure 130 allows the first sensor unit 21 to be tilted as described above in conjunction with FIG. 2. The upper portion 132 of the housing of the first sensor unit 21 provides a surface 134 that is formed at a preselected angle to the field of view of the first and second light sensitive elements described above. By tilting the first sensor unit 21 until the planar surface 134 is generally horizontal, the proper angle can be selected for the mounted sensor unit. A simple leveling tool can be used to perform this adjustment.

With continued reference to FIGS. 3-5, it can be seen that the light shields for the first and second light sensitive elements are configured to limit the fields of view of their associated light sensitive elements. This is done for the purpose of avoiding the detection of heat sources at preselected regions relative to the housing structures. For example, the upper portion 142 of the second light shield 112 shown in FIG. 5 extends away from the housing structure by a greater degree than the lower portion 152. This shape of the light shields is intended to block direct sunlight from above whether that sunlight is coming from a point aligned with the sensor unit or to the left or right sides of the associated light sensitive element. The lower portion 152 of the second light shield 112 shown in FIG. 5 does not extend as far from the housing. This is done to allow heat emitting objects to be detected at the left and right sides of the bottom portion of the field of view of the associated light sensitive element. The advantages of this type of light shield will be described in greater detail below.

Figure 6:
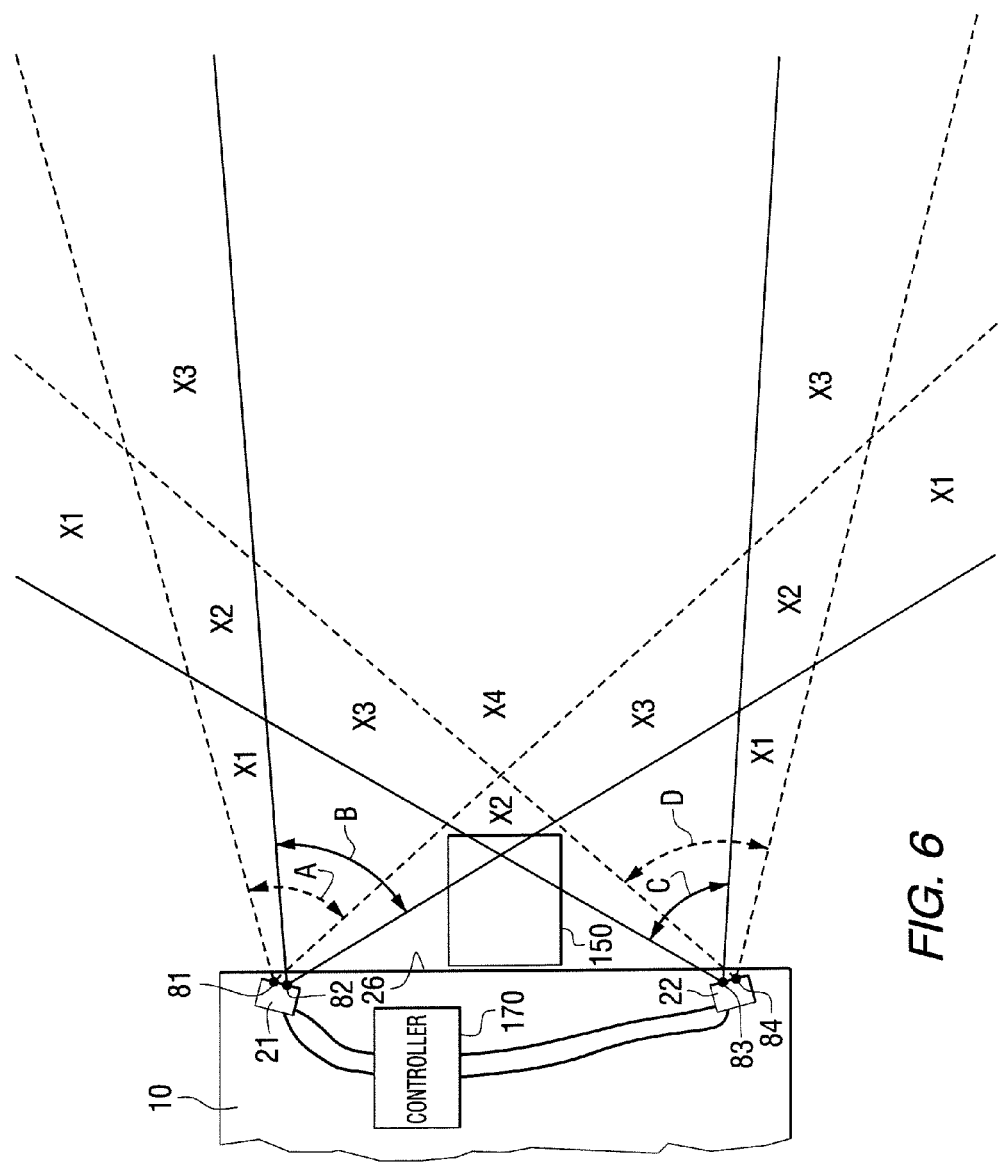
FIGS. 6 and 7 show the relationships between the fields of view of the sensors of the present invention and different portions of a marine propulsion device attached to a transom of a boat.
Figure 7:
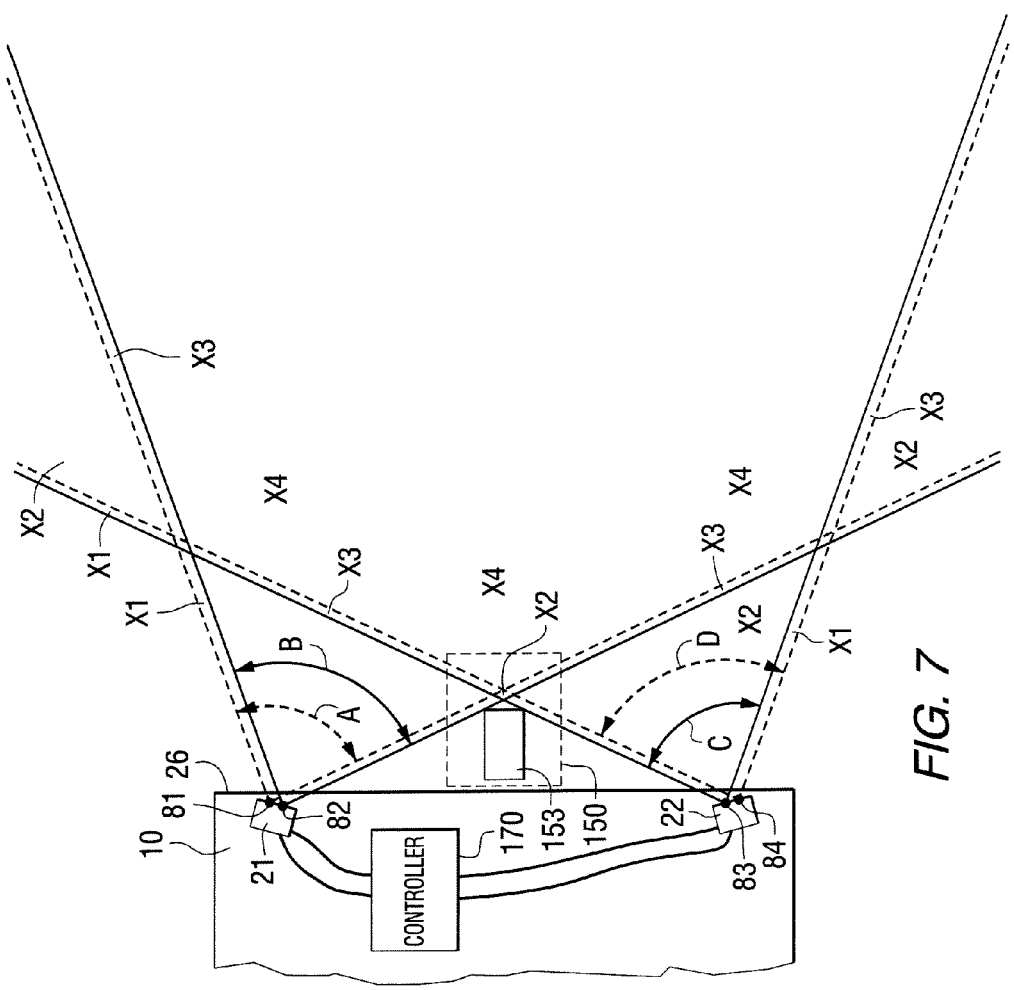

FIGS. 6 and 7 show the relationship of the fields of view of the light sensitive elements to the marine propulsion system which, when it is an outboard motor, comprises an upper cowl portion that is generally larger than a lower driveshaft portion. FIGS. 6 and 7 both show top views of a boat 10 and its transom 26 with a marine propulsion device at the center part of the transom. In FIG. 6, the upper portion of an outboard motor is identified by reference numeral 150. This comprises the cowl and the portion of the driveshaft housing immediately below the cowl. As those skilled in the art know, the cowl 150 of an outboard motor provides a cover for an internal combustion engine, some of the exhaust components, and numerous peripheral devices. It is typically wider than the driveshaft housing portion 153 that is illustrated in FIG. 7. In addition, it extends away from the transom 26 by a larger magnitude than the driveshaft housing 152. In FIG. 7, the cowl is represented by dashed lines to show the relative difference in size between the cowl 150 and the driveshaft housing 153 which extends downwardly below the cowl and supports a propeller shaft in a gear case.

Before describing the relationships between the fields of view of the four sensing elements in conjunction with FIGS. 6 and 7, it is important to understand that the shape of the light shields creates a differently shaped field of view above the center of the total field of view than below its center. With reference to FIGS. 2 and 4, the field of view 61 of the first sensor unit 21 is identified in FIG. 2 between the outermost dashed lines associated with the field of view. However, it must be understood that the field of view has an upper portion 156 and a lower portion 158. The shape of the light shields determines these upper and lower shapes. In FIG. 4, the total field of view 91 is identified between dashed lines 100 and 102. Using the first light sensitive element 81 to define a central plane 160, the total field of view 91 comprises the two portions identified by reference numerals 162 and 164. In one particularly preferred embodiment of the present invention, angle 162 is 34 degrees and angle 164 is 45 degrees. As a result, the width of the field of view 91 is 79 degrees at its upper portion identified by reference numeral 156 in FIG. 2. The first light shield 111 in FIG. 4 is cut back at its lower portion in a manner similar to that identified by the lower portion 152 of the second light shield 112 in FIG. 5. As a result, the upper portion 156 of the field of view illustrated in FIG. 2 is narrower than the lower portion 158 because of the light shield and its further extension with its upper portion 142 described above in conjunction with FIG. 5 than its lower portion 152. FIG. 6 illustrates the shapes of the upper portions of the fields of view and FIG. 7 illustrates the shapes of the lower portions.

With continued reference to FIGS. 6 and 7, the four fields of view associated with the four light sensitive elements, 81-84, are identified by letters A, B, C, and D. Field of view A is identified by dashed lines to distinguish it from field of view B. Field of view C is illustrated by solid lines to distinguish it from field of view D. The fields of view, A-D, shown in FIG. 6 overlap significantly.

In FIG. 6, various zones are identified with alphanumeric characters X1-X4 to identify the number of light sensitive elements having fields of view that include that zone. For example, the areas identified by "X3" will result in three light sensitive elements providing signals when a heat emitting object is located in that particular zone. Similarly, a heat emitting object in a zone identified as "X2" will be within the fields of view of two light sensitive elements. As can be seen, the region immediately behind the outboard motor cowl is observed by two fields of view and the region slightly farther back away from the transom 26 is observed by four fields of view. It should be understood that the fields of view illustrated in FIG. 6 represent the upper portions of the fields of view which are limited by the light shields described above.

FIG. 7 is generally similar to FIG. 6, but it illustrates the coverage and overlap of the lower fields of view 158, as described in conjunction with FIG. 2, which are wider because of the reduced light blockage by the lower portion of the light shields which, like portion 152 in FIG. 5, do not block as much of the field of view because of its cutback configuration.

In FIG. 7, the driveshaft housing 153 of the outboard motor is represented by solid lines. The dashed lines 150 of the cowl are merely provided for perspective in relation to FIG. 6. Again, the zones are identified by alphanumeric characters X1-X4 to illustrate the number of fields of view that are observing those regions to detect heat emitting objects. Behind the driveshaft housing 153, the region is monitored by four fields of view. In other words, at a reasonable distance behind the driveshaft housing 152, all four light sensitive elements will detect a heat emitting object in the area.

Any safety system can become less effective if it is susceptible to numerous false alarms. In a preferred embodiment of the present invention, several steps are taken to minimize the number of false alarms provided by the system. As an example, each of the light sensitive components, 81-84, in a preferred embodiment of the present invention, is associated with a visible light detector. In the manner described in detail in U.S. Pat. No. 7,105,800, signals from the light sensitive components are inhibited when infrared light detection is accompanied by visible light detection in the manner described. In addition to that technique for reducing false triggering, when no heat source is within the detection zone, a preferred embodiment of the present invention also incorporates a logical comparison of the signals from the four light sensitive elements, 81-84, and logically examines those four signals to determine if an actual heat source has been detected.

With continued reference to FIGS. 6 and 7, it can be seen that the first light sensitive element 81 is located at the outer starboard side of the transom 26, the second light sensitive element 82 is located at the inner starboard side of the transom 26, light sensitive element 83 is located at the inner port side of the transom 26, and the fourth light sensitive element 84 is located at the outer port side of the transom 26. The fields of view of these four light sensitive elements, 81-84, have been described above and identified by letters A, B, C, and D, respectively. For purposes of clarity, the logic performed by the controller will be described using these same letters. In other words, a signal indicating a heat emitting object is detected by the first light sensitive element 81, within its field of view A, will be identified as signal A received by the controller.

In a preferred embodiment of the present invention, a heat emitting object must be detected by at least two of the four light sensitive elements, 81-84, before the controller will determine that a heat emitting object is located within the detection zones behind the boat 10. In other words, if signals A and B are received by the controller, it will determine that a heat emitting object is present behind the boat 10. Similarly, if signals C and D are received by the controller, indicating that both the third heat sensitive element 83 and the fourth heat sensitive element 84 detected the object within their respective fields of view, the controller will determine that the object exists behind the transom 26. This logic is applied to all of the heat sensitive elements, 81-84, in the logic performed by the controller. Simply stated, a preferred embodiment of the present invention requires that at least two of the heat sensitive elements, 81-84, indicate the presence of a heat source before a valid detection is accepted by the controller 170. In a particularly preferred embodiment of the present invention, one exception to this general rule is applied. Detection by the second and third light sensitive elements, 82 and 83, alone will not be sufficient to generate an alarm condition by the controller 170. The controller 170, in a preferred embodiment of the present invention, will react to signals A and B, A and C, A and D, B and D, or C and D, but will not react if the only two signals are B and C.

Preferred embodiments of the present invention combine the use of the light shields, the provision of four different light sensitive elements, 81-84, the logic of requiring two or more signals from the four light sensitive elements, and the provision that signals from only the second and third light sensitive elements, 82 and 83, will not be sufficient to generate an alarm condition. It should be understood that the generation of an alarm condition by the controller 170, in response to detecting a heat emitting object in the detection zone behind the boat 10, need not be followed by any specific action to be considered within the scope of the present invention. In other words, the signal provided by the controller 170 can be implemented in many different ways in alternative embodiments of the present invention. As an example, the detection of a heat emitting object by the controller 170 can be followed by an immediate cessation of operation of the engine of the marine propulsion device. However, it is recognized that this may not be the preferred action in all embodiments and in all applications of the present invention. Alternatively, the detection of a heat emitting object by the present invention can be followed by the immediate sounding of an alarm, such as a horn, and then the shutting off of the engine a brief time later. Those skilled in the art of alarm systems are aware that many different degrees of reaction, following an alarm condition being sensed, can be used in various different applications. In addition, those skilled in the art are aware that a system like the present invention can be disabled if the marine vessel is moving at a forward speed in excess of a preselected magnitude. Additionally, preferred embodiments of the present invention can be adapted to prevent starting an engine when an alarm condition is sensed by the controller in the manner described above, but may not immediately shut off an engine if a heat emitting object is detected after the engine has been properly started. These are all options that are available as optional applications in conjunction with various embodiments of the present invention and are not limiting thereto.

Although the sensor unit shown in FIGS. 3-5 is described in terms of a first sensor unit 21 comprising first and second housing structures, 71 and 72, it should be understood that a preferred embodiment of the present invention is intended to use two sensor units, 21 and 22, and each of the two sensor units is intended to comprise first and second integral housing structures. Each of the housing structures has a light sensitive element, such as elements 81-84, and a light shield, such as light shields 111 and 112 illustrated in FIG. 4. The sensor unit structure is intentionally made to be interchangeable with other sensor unit structures so that they can be attached to either the port or starboard sides of the boat at its transom area. In addition, each sensor unit is configured to comprise the two associated housing structures to facilitate these assemblies and attachments to a boat. Naturally, it should be understood that four separate housing structures could be attached to the boat at positions which dispose the four light sensitive elements at appropriate locations. In a preferred embodiment of the present invention, the light sensitive elements, 81-84, are infrared sensing elements that respond to motion of heat emitting objects.

In the following description of the present invention, it should be understood that the preferred embodiment of the present invention incorporates two sensor units and four light sensitive elements even though only one sensor unit 21 is illustrated in FIGS. 3-5. In addition, it should be understood that, in a preferred embodiment of the present invention, the light shields associated with each of the four lenses are essentially identical to the other light shields.

With reference to FIG. 4, it can be seen that the lens 121 is located with its light sensitive element 81 at a position that is asymmetric with respect to the light shield 111. In other words, the distance represented by arrow 201 is not equal to the distance represented by arrow 202. Dashed line 210 is representative of a plane that bisects the light shield 111 to result in arrows 212 and 213 being equal to each other. It is therefore clearly shown that the lens 121 and its light sensitive element 81 are located asymmetrically with respect to the light shield 111. This results in the inequality between angles 162 and 164 that is described above. The offset position of the lens 121 with respect to the light shield 111 is provided in a particularly preferred embodiment of the present invention and is not required in all embodiments. Because of the similarity between the first and second sensor units, 21 and 22, and the similarity between the four light shields, the four lenses, and the four light sensitive elements, 81-84, the preferred embodiment of the present invention is described herein with reference to one or more representative reference numerals and not always with respect to all four reference numerals that could possibly be used to identify a component.

A heat source sensor, made in accordance with a preferred embodiment of the present invention, comprises a first housing structure 71, a first light sensitive element 81, a first light shield 111, a second housing structure 72, a second light sensitive element 82, a second light shield 112, and a controller 170. The first and second light shields are disposed at least partially around the first and second fields of view, A and B, proximate the first and second housing structures. These light shields are configured to limit the associated fields of view for the purpose of avoiding the detection of heat sources at first preselected regions relative to the housing structures. More particularly, the light shields are intended to prevent direct sunlight from adversely affecting the system and, in addition, to prevent reflected infrared light from reflecting off the surface of the cowl and adversely providing a false indication of a heat source in the water behind the boat. Lens structures are disposed between the light sensitive elements and their respective fields of view. The lens structures can be Fresnel lenses. First and second housing structures are combined to form a first sensor unit 21. Similarly, third and fourth housing structures are combined to form a second sensor unit. The third and fourth housing structures are each provided with third and fourth light sensitive elements and third and fourth light shields, respectively, in a manner generally similar to that described above in conjunction with the first sensor unit 21. The four fields of view of the four light sensitive elements, 81-84, are directed to intersect at locations behind the boat transom 26 at a common location. As described above, the sensor units, 21 and 22, are attached to the boat and directed so that their respective fields of view intersect behind the boat. In addition, the first and second sensor units are tilted to direct their fields of view in a generally downward direction toward the water at a common area behind the boat.

With continued reference to FIGS. 1-7, a method for detecting a heat source proximate a marine vessel, in accordance with a preferred embodiment of the present invention, comprises the steps of monitoring first and second fields of view in a direction from first and second sensing devices, providing first and second signals when a heat source is within the first and second fields of view, receiving the first and second signals, and determining the presence or absence of a heat source within a detection zone as a function of both the first and second signals. The first and second sensing devices each contain infrared devices. The first and second sensing devices, such as devices 21 and 22, are attached to the marine vessel with the first and second fields of view directed in a rearward direction to define a detection zone by an intersection of the first and second fields of view which are located a preselected distance behind the marine vessel. The first sensing device 21 can be attached to a starboard side of a rearward portion of the marine vessel and a second sensing device 22 can be attached to a port side of the rearward portion of the marine vessel. Each of the sensing devices can comprise two sensors with one of the sensors being disposed closer to a centerline of the marine vessel than the other sensor. In all, in a preferred embodiment of the present invention, first, second, third, and fourth sensors are each configured to provide an individual signal representing the detection of a heat source within its individual field of view. The method can further comprise the step of providing an alarm signal in response to receipt of individual signals from at least two of the first, second, third, and fourth sensors. The method can further comprise the step of providing an alarm signal in response to receipt of individual signals from the first and second sensors, the first and third sensors, the first and fourth sensors, the second and fourth sensors, or the third and fourth sensors. In a particularly preferred embodiment of the present invention, it can further comprise the step of refraining from providing the alarm signal in response to receipt of individual signals from only the second and third sensors which are most proximate the centerline of the boat.

Figure 8:
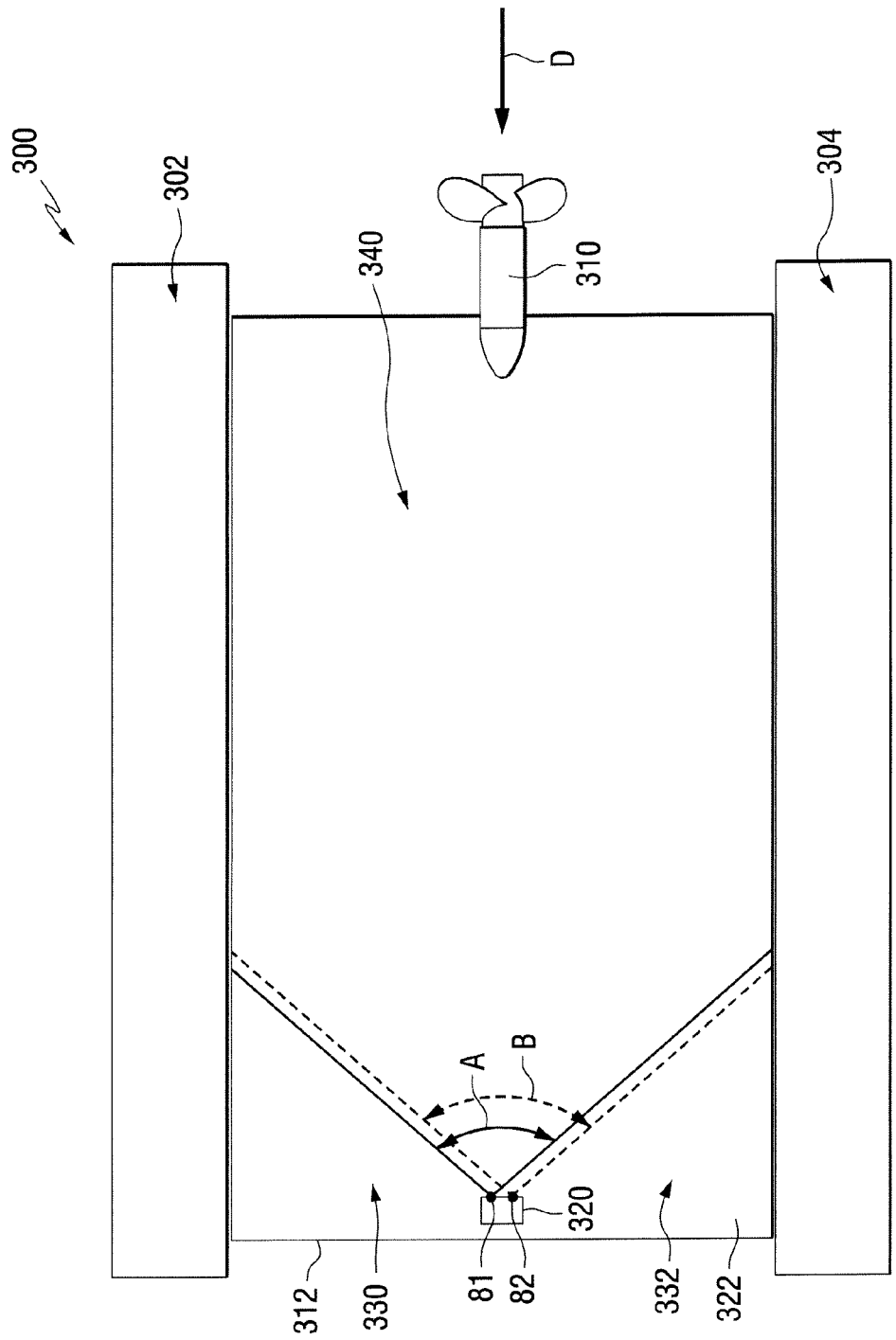
FIG. 8 is a bottom view of a pontoon boat utilizing an embodiment of the present invention.

FIG. 8 is a bottom view of a pontoon boat 300 with a port side pontoon 302 and a starboard side pontoon 304. Arrow D illustrates the direction of travel of the pontoon boat 300 when the propulsion device 310 is operation in forward gear. Near the front portion 312 of the pontoon boat 300, a first sensing device 320 is attached to the deck 322. It should be understood that the first sensing device 320 is generally similar to the device illustrated in FIG. 3 and identified by reference numeral 21. However, when used in conjunction with a pontoon boat, various embodiments of the present invention can be used in a manner that may not be appropriate for use at the rear portion of other types of marine vessels. In other words, because of the light blocking capability of the deck 322, some of the light blocking characteristics of the present invention described above in conjunction with FIGS. 1-7, may not be necessary. In other words, it is less likely that sun reflecting off the surface of the water will have an adverse affect which is as significant as it can be if the deck 322 was not present to block direct sunlight. In addition, although two fields of view are provided by a preferred embodiment of the first sensing device 320, alternative embodiments having one field of view can also be used.

With continued reference to FIG. 8, it should be understood that a heat emitting object, such as a mammal, that is relatively stationary above the surface of a body of water over which the pontoon boat 300 passes, will move from left to right relative to the pontoon boat in FIG. 8. When it is to the left of the first sensing device 320, it will not be in either field of view, A or B, of the device. Then, as the pontoon boat 300 continues to move from right to left in FIG. 8 relative to the stationary heat emitting body, the heat emitting body will move past the zones identified by reference numerals 330 and 332 and into the protected zone 340 covered by the first and second fields of view, A and B. Naturally, it should be understood that the first sensing device 320 can alternatively be attached to the pontoon boat 300 at a location further toward the left in FIG. 8. This would increase the coverage by the first and second fields of view, A and B.

With continued reference to FIG. 8, the method which is applicable to various embodiments of the present invention can receive the signals from the two sensors, 81 and 82, and respond to them in various alternative ways. When a single sensing element, 81 or 82, is used, only a single signal would be provided to a controller. When two signals are provided, an alarm condition can be declared under either of two alternative conditions. In one condition, an alarm signal is generated when both the first and second signals, from devices 81 and 82, are received. Alternatively, an alarm signal can be generated when either one or both of the first and second signals from devices 81 and 82 are received. Naturally, if only one infrared device, 81 or 82, is used, an alarm condition would be generated when a signal is received from that device.

With continued reference to FIG. 8, it can be seen that some of the particularly advantageous characteristics of the present invention are not required when it is used in conjunction with a pontoon boat. If the first sensing device 320 is placed under the deck 322 of the pontoon boat 300, the deck provides significant protection from the light rays from the sun. As a result, the light shields provided in preferred embodiments of the present invention may not be absolutely required. In addition, the use of an algorithm that requires two or more signals from two or more light sensitive elements may not be required because adverse light reflections from reflective surfaces are not as prevalent under the deck of the pontoon boat 300 and between the pontoons, 302 and 304.

Although the present invention has been described with particular specificity and illustrated to show preferred embodiments, it should be understood that alternative embodiments are also within its scope.

I claim:
1. A heat source sensor, comprising:
    a first housing structure;
    a first light sensitive element mounted in said first housing structure and configured to have a first field of view which extends away from said first housing structure in a first direction, said first light sensitive element being configured to provide a first signal in response to the detection of a source of heat within said first field of view;

a first light shield disposed at least partially around said first field of view proximate said first housing structure, said first light shield being configured to limit said first field of view for the purpose of avoiding the detection of heat sources at first preselected regions relative to said first housing structure;

a second housing structure;

a second light sensitive element mounted in said second housing structure and configured to have a second field of view which extends away from said second housing structure in a second direction, said second light sensitive element being configured to provide a second signal in response to the detection of a source of heat within said second field of view;

a second light shield disposed at least partially around said second field of view proximate said second housing structure, said second light shield being configured to limit said second field of view for the purpose of avoiding the detection of heat sources at second preselected regions relative to said second housing structure, said first and second fields of view being disposed in intersecting relation with each other; and a controller configured to receive said first and second signals, said first and second light sensitive elements being attached to port and starboard sides of a boat having a drive unit extending longitudinally aft therefrom, said first light shield providing upper and lower portions of said first field of view, said second light shield providing upper and lower portions of said second field of view, said upper portions of said first and second fields of view overlapping at a first zone aft of and longitudinally aligned with said drive unit, said lower portions of said first and second fields of view overlapping at a second zone aft of and longitudinally aligned with said drive unit, said second zone having a greater area than said first zone.

2. The sensor of claim 1, wherein:
said first zone is above said second zone.

3. A heat source sensor, comprising:
a first housing structure;
a first light sensitive element mounted in said first housing structure and configured to have a first field of view which extends away from said first housing structure in a first direction, said first light sensitive element being configured to provide a first signal in response to the detection of a source of heat within said first field of view;

a first light shield disposed at least partially around said first field of view proximate said first housing structure, said first light shield being configured to limit said first field of view for the purpose of avoiding the detection of heat sources at first preselected regions relative to said first housing structure;

a second housing structure;
a second light sensitive element mounted in said second housing structure and configured to have a second field of view which extends away from said second housing structure in a second direction, said second light sensitive element being configured to provide a second signal in response to the detection of a source of heat within said second field of view;

a second light shield disposed at least partially around said second field of view proximate said second housing structure, said second light shield being configured to limit said second field of view for the purpose of avoiding the detection of heat sources at second preselected regions relative to said second housing structure, said first and second fields of view being disposed in intersecting relation with each other;

a third housing structure;
a third light sensitive element mounted in said third housing structure and configured to have a third field of view which extends away from said third housing structure in a third direction, said third light sensitive element being configured to provide a third signal in response to the detection of a source of heat within said third field of view;

a third light shield disposed at least partially around said third field of view proximate said third housing structure, said third light shield being configured to limit said third field of view for the purpose of avoiding the detection of heat sources at third preselected regions relative to said third housing structure;

a fourth housing structure;
a fourth light sensitive element mounted in said fourth housing structure and configured to have a fourth field of view which extends away from said fourth housing structure in a fourth direction, said fourth light sensitive element being configured to provide a fourth signal in response to the detection of a source of heat within said fourth field of view;

a fourth light shield disposed at least partially around said fourth field of view proximate said fourth housing structure, said fourth light shield being configured to limit said fourth field of view for the purpose of avoiding the detection of heat sources at fourth preselected regions relative to said fourth housing structure, said third and fourth fields of view being disposed in intersecting relation with each other; and a controller configured to receive said first, second, third, and fourth signals, said first and second light sensitive elements being attached to a starboard side of a boat having a drive unit extending longitudinally aft therefrom, said third and fourth light sensitive elements being attached to a port side of said boat, said second light shield providing upper and lower portions of said second field of view, said third light shield providing upper and lower portions of said third field of view, said upper portions of said second and third fields of view overlapping at a first zone aft of and longitudinally aligned with said drive unit, said lower portions of said second and third fields of view overlapping at a second zone aft of and longitudinally aligned with said drive unit, said second zone having a greater area than said first zone.

4. The sensor of claim 3, wherein:
said first zone is above said second zone.

5. A heat source sensor, comprising:
a first housing structure;
a first light sensitive element mounted in said first housing structure and configured to have a first field of view which extends away from said first housing structure in a first direction, said first light sensitive element being configured to provide a first signal in response to the detection of a source of heat within said first field of view;

a first light shield disposed at least partially around said first field of view proximate said first housing structure, said first light shield being configured to limit said first field of view for the purpose of avoiding the detection of heat sources at first preselected regions relative to said first housing structure;

a second housing structure;

a second light sensitive element mounted in said second housing structure and configured to have a second field of view which extends away from said second housing structure in a second direction, said second light sensitive element being configured to provide a second signal in response to the detection of a source of heat within said second field of view;

a second light shield disposed at least partially around said second field of view proximate said second housing structure, said second light shield being configured to limit said second field of view for the purpose of avoiding the detection of heat sources at second preselected regions relative to said second housing structure, said first and second fields of view being disposed in intersecting relation with each other;

a third housing structure;

a third light sensitive element mounted in said third housing structure and configured to have a third field of view which extends away from said third housing structure in a third direction, said third light sensitive element being configured to provide a third signal in response to the detection of a source of heat within said third field of view;

a third light shield disposed at least partially around said third field of view proximate said third housing structure, said third light shield being configured to limit said third field of view for the purpose of avoiding the detection of heat sources at third preselected regions relative to said third housing structure;

a fourth housing structure;

a fourth light sensitive element mounted in said fourth housing structure and configured to have a fourth field of view which extends away from said fourth housing structure in a fourth direction, said fourth light sensitive element being configured to provide a fourth signal in response to the detection of a source of heat within said fourth field of view;

a fourth light shield disposed at least partially around said fourth field of view proximate said fourth housing structure, said fourth light shield being configured to limit said fourth field of view for the purpose of avoiding the detection of heat sources at fourth preselected regions relative to said fourth housing structure, said third and fourth fields of view being disposed in intersecting relation with each other;

a controller configured to receive said first, second, third, and fourth signals, said first and second housing structures being combined to form a first sensor unit, said third and fourth housing structures being combined to form a second sensor unit, said first sensor unit being attached to a starboard side of a boat transom and said second sensor unit being attached to a port side of a boat transom, at least one of said first and second fields of view intersecting with at least one of said third and fourth fields of view at a common location behind said boat transom;

a first lens structure disposed between said first light sensitive element and said first field of view;

a second lens structure disposed between said second light sensitive element and said second field of view;

a third lens structure disposed between said third light sensitive element and said third field of view; and a fourth lens structure disposed between said fourth light sensitive element and said fourth field of view, said first and second light sensitive elements being attached to a starboard side of a boat having a drive unit extending longitudinally aft therefrom, said third and fourth light sensitive elements being attached to a port side of said boat, said second light shield providing upper and lower portions of said second field of view, said third light shield providing upper and lower portions of said third field of view, said upper portions of said second and third fields of view overlapping at a first zone aft of and longitudinally aligned with said drive unit, said lower portions of said second and third fields of view overlapping at a second zone aft of and longitudinally aligned with said drive unit, said second zone having a greater area than said first zone.

6. The sensor of claim 5, wherein:

said first zone is above said second zone.

* * * * *